United States Patent
Durocher et al.

(10) Patent No.: US 12,152,502 B2
(45) Date of Patent: Nov. 26, 2024

(54) SELECTIVELY COATED GAS PATH SURFACES WITHIN A HOT SECTION OF A GAS TURBINE ENGINE

(71) Applicant: Pratt & Whitney Canada Corp., Longueuil (CA)

(72) Inventors: Eric Durocher, Boucherville (CA); Ian MacFarlane, Boucherville (CA); Guy Lefebvre, St. Bruno de Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/514,602

(22) Filed: Oct. 29, 2021

(65) Prior Publication Data
US 2023/0138749 A1 May 4, 2023

(51) Int. Cl.
*F01D 5/28* (2006.01)
*F01D 9/04* (2006.01)

(52) U.S. Cl.
CPC ............ *F01D 5/288* (2013.01); *F01D 9/041* (2013.01); *F05D 2240/12* (2013.01); *F05D 2240/80* (2013.01); *F05D 2260/231* (2013.01); *F05D 2300/611* (2013.01)

(58) Field of Classification Search
CPC ...... F01D 5/288; F01D 9/041; F05D 2240/12; F05D 2240/80; F05D 2260/231; F05D 2300/611
See application file for complete search history.

(56) References Cited

U.S. PATENT DOCUMENTS

| | | | |
|---|---|---|---|
| 5,645,399 A | 7/1997 | Angus | |
| 5,942,337 A * | 8/1999 | Rickerby | C23C 10/58 |
| | | | 428/629 |
| 6,095,755 A * | 8/2000 | Houston | C23C 4/01 |
| | | | 416/224 |
| 6,126,400 A | 10/2000 | Nichols | |
| 6,485,845 B1 * | 11/2002 | Wustman | C23C 28/00 |
| | | | 428/650 |
| 7,950,236 B2 | 5/2011 | Durocher | |
| 8,070,454 B1 * | 12/2011 | Rawlings | F01D 5/288 |
| | | | 416/228 |
| 8,096,746 B2 | 1/2012 | Durocher | |

(Continued)

FOREIGN PATENT DOCUMENTS

| | | | |
|---|---|---|---|
| EP | 1469100 A1 * | 10/2004 | ............ C23C 14/06 |
| EP | 2224167 A1 | 9/2010 | |

(Continued)

OTHER PUBLICATIONS

EP search report for EP22204807.6 dated Jan. 20, 2023.

*Primary Examiner* — Brian Christopher Delrue
(74) *Attorney, Agent, or Firm* — Getz Balich LLC (57) ABSTRACT

An apparatus is provided for a gas turbine engine. This gas turbine engine apparatus includes a hot section structure of the gas turbine engine. The hot section structure is configured with a plurality of surfaces respectively forming boundaries of a gas path through the hot section structure. The surfaces include a first surface and a second surface. The hot section structure includes metal and thermal barrier material. The first surface is formed by the metal. The second surface is formed by the thermal barrier material.

15 Claims, 8 Drawing Sheets

(56) References Cited

U.S. PATENT DOCUMENTS

| | | | |
|---|---|---|---|
| 8,511,993 B2* | 8/2013 | Kemppainen | C23C 4/02 |
| | | | 416/241 B |
| 8,740,557 B2 | 6/2014 | Durocher | |
| 9,719,371 B2* | 8/2017 | Hannam | F01D 9/041 |
| 10,047,613 B2* | 8/2018 | Ford | F01D 5/288 |
| 10,927,707 B2 | 2/2021 | Roberge | |
| 11,041,390 B1* | 6/2021 | Cosher | F01D 5/186 |
| 11,098,598 B1* | 8/2021 | Monastero | F01D 9/02 |
| 2007/0148003 A1* | 6/2007 | Trishkin | F01D 5/288 |
| | | | 416/241 R |
| 2010/0247323 A1* | 9/2010 | Persky | F01D 5/288 |
| | | | 428/209 |
| 2012/0275922 A1* | 11/2012 | Praisner | F01D 9/041 |
| | | | 416/223 A |
| 2013/0058787 A1 | 3/2013 | Batt | |
| 2013/0167552 A1 | 7/2013 | Keny | |
| 2013/0236301 A1 | 9/2013 | Chen | |
| 2014/0000285 A1* | 1/2014 | Bergman | B22C 9/04 |
| | | | 415/178 |
| 2014/0093361 A1* | 4/2014 | Riley | F01D 5/187 |
| | | | 415/178 |
| 2014/0219778 A1* | 8/2014 | Boeke | F01D 25/246 |
| | | | 415/115 |
| 2015/0322804 A1* | 11/2015 | Butler | F01D 9/041 |
| | | | 29/889.71 |
| 2016/0003152 A1* | 1/2016 | Riley | F02C 3/04 |
| | | | 415/115 |
| 2016/0017733 A1* | 1/2016 | Riley | C23C 4/11 |
| | | | 427/446 |
| 2017/0107833 A1 | 4/2017 | Brewer | |
| 2020/0149426 A1* | 5/2020 | Strock | C23C 28/30 |
| 2021/0355834 A1* | 11/2021 | Dvorozniak | F01D 5/288 |

FOREIGN PATENT DOCUMENTS

| | | | | |
|---|---|---|---|---|
| EP | 2662470 A1 * | 11/2013 | | C23C 28/321 |
| EP | 2662529 A1 * | 11/2013 | | B23P 15/02 |

* cited by examiner

SELECTIVELY COATED GAS PATH SURFACES WITHIN A HOT SECTION OF A GAS TURBINE ENGINE

TECHNICAL FIELD

This disclosure relates generally to a gas turbine engine and, more particularly, to a hot section within a gas turbine engine.

BACKGROUND INFORMATION

A hot section within a gas turbine engine include various hot section components. These hot section components may be exposed to hot gases (e.g., combustion products) flowing through a core gas path extending through the hot section. This exposure to the hot gases may cause the hot section components to thermally expand or contract at different rates, particularly during transient operating conditions. Such differential thermal expansion or contraction may impart internal stresses on the hot section components. There is a need in the art to reduce thermally induced internal stresses within a hot section of a gas turbine engine.

SUMMARY

According to an aspect of the present disclosure, an apparatus is provided for a gas turbine engine. This gas turbine engine apparatus includes a hot section structure of the gas turbine engine. The hot section structure is configured with a plurality of surfaces respectively forming boundaries of a gas path through the hot section structure. The surfaces include a first surface and a second surface. The hot section structure includes metal and thermal barrier material. The first surface is formed by the metal. The second surface is formed by the thermal barrier material.

According to another aspect of the present disclosure, another apparatus is provided for a gas turbine engine. This gas turbine engine apparatus includes a gas path wall forming a peripheral boundary of a gas path within the gas turbine engine. The gas path wall includes a metal body and a thermal barrier coating disposed on the metal body. The metal body forms and is exposed to the gas path along a first portion of the peripheral boundary. The thermal barrier coating forms and is exposed to the gas path along a second portion of the peripheral boundary.

According to still another aspect of the present disclosure, another apparatus is provided for a gas turbine engine. This gas turbine engine apparatus includes a first platform, a second platform and a plurality of vanes. The first platform extends axially along and circumferentially about a centerline. The second platform extends axially along and circumferentially about the centerline. The vanes are arranged circumferentially about the centerline. Each of the vanes extends radially between and is connected to the first platform and the second platform. The vanes include a first vane. The first vane is configured with a thermal barrier coating. At least a portion of the first platform adjacent the first vane is configured without a thermal barrier coating.

The gas turbine engine apparatus may also include a combustor section and a vane array structure downstream of the combustor section along a gas path. The vane array structure may include the first platform, the second platform and the vanes.

The first portion of the peripheral boundary may be upstream of and/or next to the second portion of the peripheral boundary along the gas path.

The gas path wall may be configured as or otherwise include an exhaust wall.

The thermal barrier material may be or otherwise include ceramic.

The first surface may be contiguous with the second surface.

The gas path may extend longitudinally through the hot section structure. The first surface may be longitudinally aligned with the second surface.

The gas path may extend longitudinally through the hot section structure. The first surface may be laterally aligned with the second surface.

At least a portion of the first surface may be upstream of the second surface along the gas path.

The gas turbine engine apparatus may also include a combustor section upstream of the hot section structure along the gas path.

The hot section structure may be configured as or otherwise include a gas path wall extending along a side of the gas path. The gas path wall may include the first surface and the second surface.

The hot section structure may include a vane extending across the gas path. The vane may include the first surface and the second surface.

The thermal barrier material may form at least seventy-five percent (75%) of an external surface area of the vane that is exposed to the gas path.

The hot section structure may include a gas path wall and a vane projecting out from the gas path wall. The gas path wall may include the first surface. The vane may include the second surface.

At least a portion of the first surface may have a straight sectional geometry. At least a portion of the second surface may have a curved sectional geometry.

The hot section structure may be configured as or otherwise include a turbine exhaust structure.

The hot section structure may be configured as or otherwise include a turbine support structure.

The hot section structure may be configured as or otherwise include a vane array structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
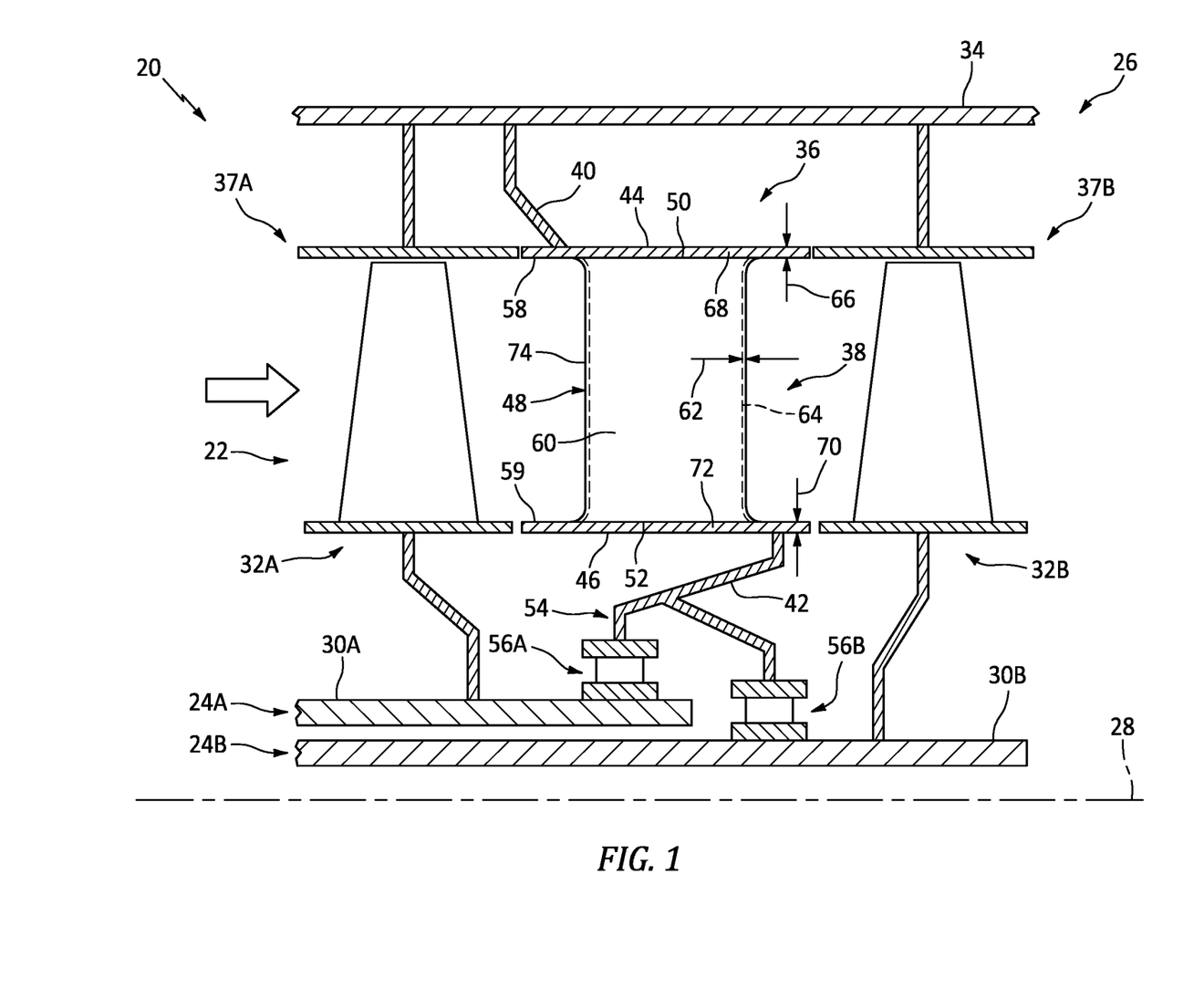
FIG. 1 is a schematic sectional illustration of a portion of a hot section of a gas turbine engine.

FIG. 1 illustrates a hot section 20 of a gas turbine engine. The term "hot section" describes herein a section of the gas turbine engine exposed to hot gases; e.g., combustion products. A (e.g., annular) core gas path 22 of the gas turbine engine, for example, extends longitudinally through the hot section 20 of FIG. 1. Examples of the hot section 20 include, but are not limited to, a combustor section, a turbine section and an exhaust section. However, for ease of description, the hot section 20 of FIG. 1 is described below as a turbine section of the gas turbine engine. The hot section 20 of FIG. 1 includes one or more rotor assemblies 24A and 24B (generally referred to as "24") and a stationary structure 26.

Each of the rotor assemblies 24 is configured to rotate about a rotational axis 28 of the gas turbine engine, which rotational axis 28 may also be an axial centerline of the gas turbine engine. Each of the rotor assemblies 24 includes a shaft 30A, 30B (generally referred to as "30") and at least a hot section rotor 32A, 32B (generally referred to as "32"); e.g., a turbine rotor. The shaft 30 extends axially along the rotational axis 28. The hot section rotor 32 is connected to the shaft 30. The hot section rotor 32 includes a plurality of hot section rotor blades (e.g., turbine blades) arranged circumferentially around and connected to one or more respective hot section rotor disks. The hot section rotor blades, for example, may be formed integral with or mechanically fastened, welded, brazed, adhered and/or otherwise attached to the respective hot section rotor disk(s).

The stationary structure 26 of FIG. 1 includes a hot section case 34 (e.g., a turbine case) and a hot section structure 36. The hot section case 34 is configured to house at least a portion or an entirety of the hot section 20 and its components 24A, 24B and 36. The hot section case 34 extends axially along and circumferentially about (e.g., completely around) the rotational axis 28.

The hot section structure 36 is configured to guide the hot gases (e.g., combustion products) received from an upstream section 37A of the hot section (e.g., a high pressure turbine (HPT) section) to a downstream section 37B of the hot section (e.g., a low pressure turbine (LPT) section) through the gas path 22. The hot section structure 36 of FIG. 1 is also configured to support one or more of the rotor assemblies 24 within the hot section 20 and its hot section case 34. The hot section structure 36 of FIG. 1, for example, is configured as a support structure such as, but not limited to, a turbine frame structure; e.g., a mid-turbine frame. This hot section structure 36 includes a vane array structure 38 and one or more structural supports 40 and 42; e.g., struts, frames, etc.

Figure 2:
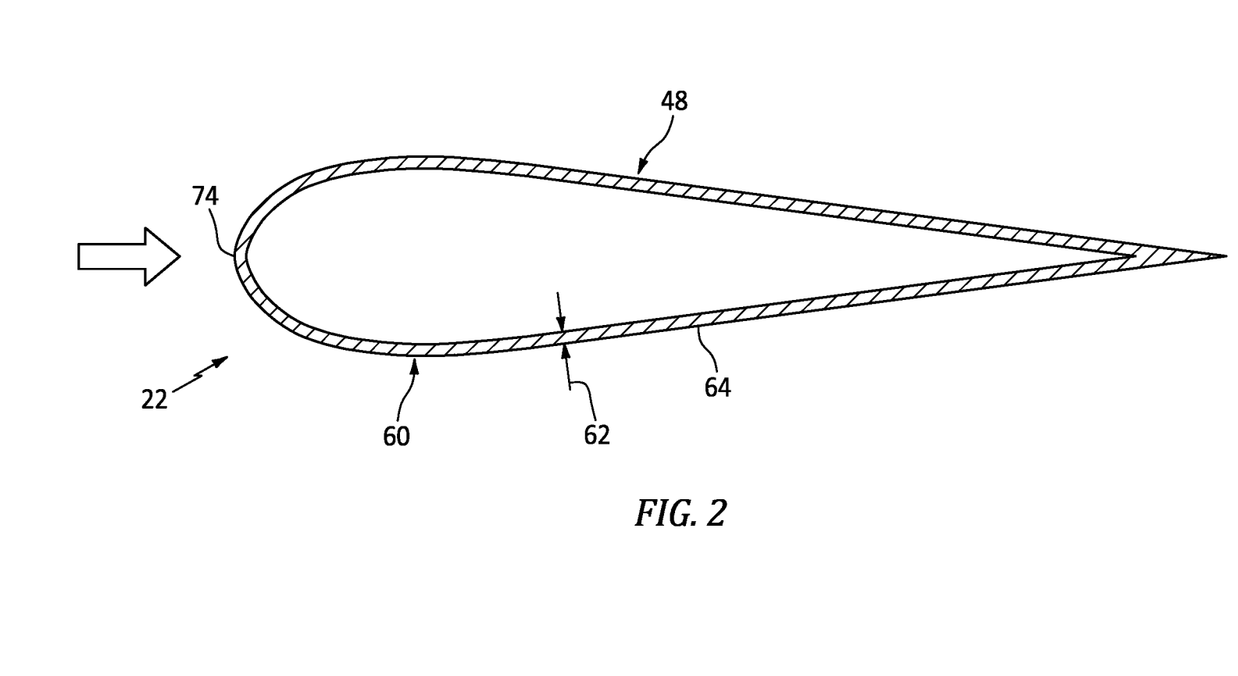
FIG. 2 is a cross-sectional illustration of a vane for a vane array structure of the hot section.

The vane array structure 38 includes a (tubular) outer platform 44, a (e.g., tubular) inner platform 46 and a plurality of (e.g., stationary) vanes 48. The outer platform 44 extends axially along and circumferentially about (e.g., completely around) the rotational axis 28 and the structure components 46 and 48. This outer platform 44 may form an outer peripheral boundary of the gas path 22 through the vane array structure 38. The inner platform 46 extends axially along and circumferentially about (e.g., completely around) the rotational axis 28. This inner platform 46 may form an inner peripheral boundary of the gas path 22 through the vane array structure 38. The vanes 48 are distributed circumferentially about the rotational axis 28 in an annular array radially between the outer platform 44 and the inner platform 46. Each vane 48 extends radially between and to the outer platform 44 and the inner platform 46, thereby projecting radially across the gas path 22. Each vane 48 is (e.g., fixedly) connected to the outer platform 44 and/or the inner platform 46 at a respective end 50, 52 of the vane 48. Each vane 48 may form a side (e.g., an inter-vane) boundary of the gas path 22. With this arrangement, the hot gases flowing through the gas path 22 within the vane array structure 38 are radially bounded and guided by the outer platform 44 and the inner platform 46 and flow around (e.g., to either side of) each vane 48; see also FIG. 2.

The outer structural support 40 is connected to the outer platform 44 and the hot section case 34. The outer structural support 40 of FIG. 1, for example, projects radially out from the outer platform 44 to the hot section case 34. The outer structural support 40 may thereby structurally tie the vane array structure 38 to the hot section case 34.

The inner structural support 42 is connected to the inner platform 46, and rotatably supports one or more of the rotor assemblies 24. The inner structural support 42 of FIG. 1, for example, includes (or is connected to) a bearing support frame 54, and projects radially in from the inner platform 46 to the bearing support frame 54. Each shaft 30A, 30B is rotatably supported by a respective bearing 56A, 56B (generally referred to as "56") (e.g., a roller element bearing), which bearing 56 is mounted to and supported by the bearing support frame 54. The inner support structure 42 may thereby structurally tie the rotor assemblies 24 to the vane array structure 38.

During operation, gas path surfaces of the hot section structure 36 and its vane array structure 38 are exposed to (e.g., in contact with) the hot gases flowing through the gas path 22. These gas path surfaces include those surfaces which form the boundaries of the gas path 22 within the vane array structure 38. The gas path surfaces of FIG. 1, for example, include a radial inner surface 58 of the outer platform 44, a radial outer surface 59 of the inner platform 46 and exterior surfaces 60 of the vanes 48; see also FIG. 2. The hot gas exposure may create relatively large thermal gradients across the vane array structure 38, particularly during transient operating conditions. For example, a thickness 62 of a sidewall 64 of each vane 48 (see also FIG. 2) may be thinner than a thickness 66 of a sidewall 68 of the outer platform 44 and/or a thickness 70 of a sidewall 72 of the inner platform 46. Furthermore, while the hot gases flow along the outer platform 44, the inner platform 46 and the vanes 48, the hot gases also impinge against a leading edge 74 of each vane 48. Each vane 48 and its vane sidewall 64 may therefore heat up (or cool down) faster than the outer platform 44 and its outer platform sidewall 68 and/or the inner platform 46 and its inner platform sidewall 72. This may result in uneven thermal expansion (or contraction) of the structure components 44, 46 and 48 as shown, for example, in FIGS. 3A and 3B.

Figure 3A:
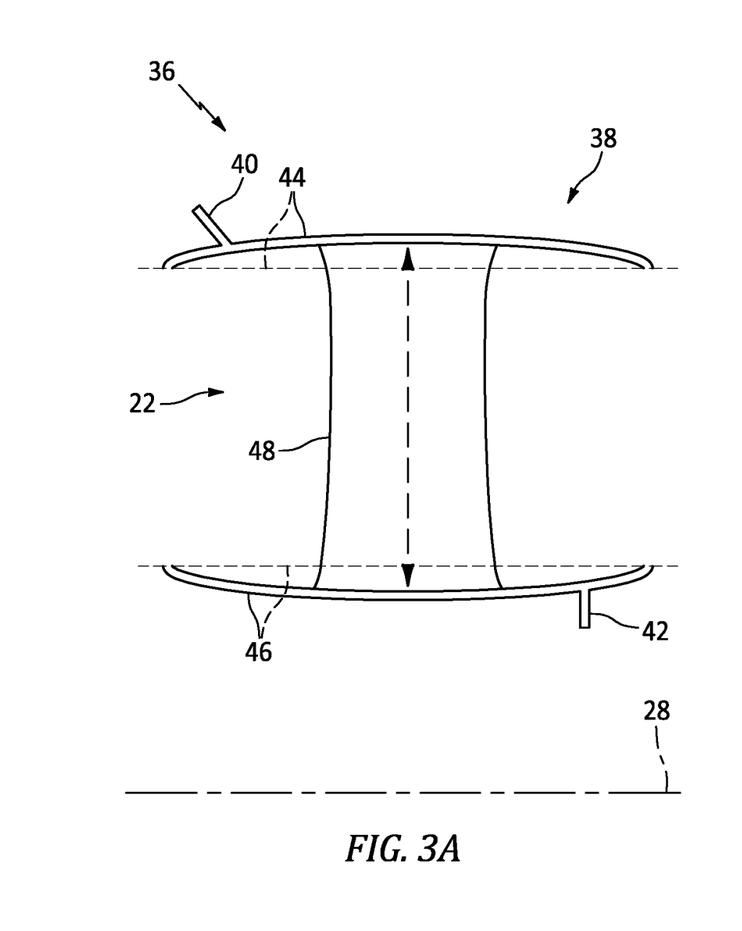
FIG. 3A is a schematic illustration of a portion of a vane array structure during uneven thermal expansion.
Figure 3B:
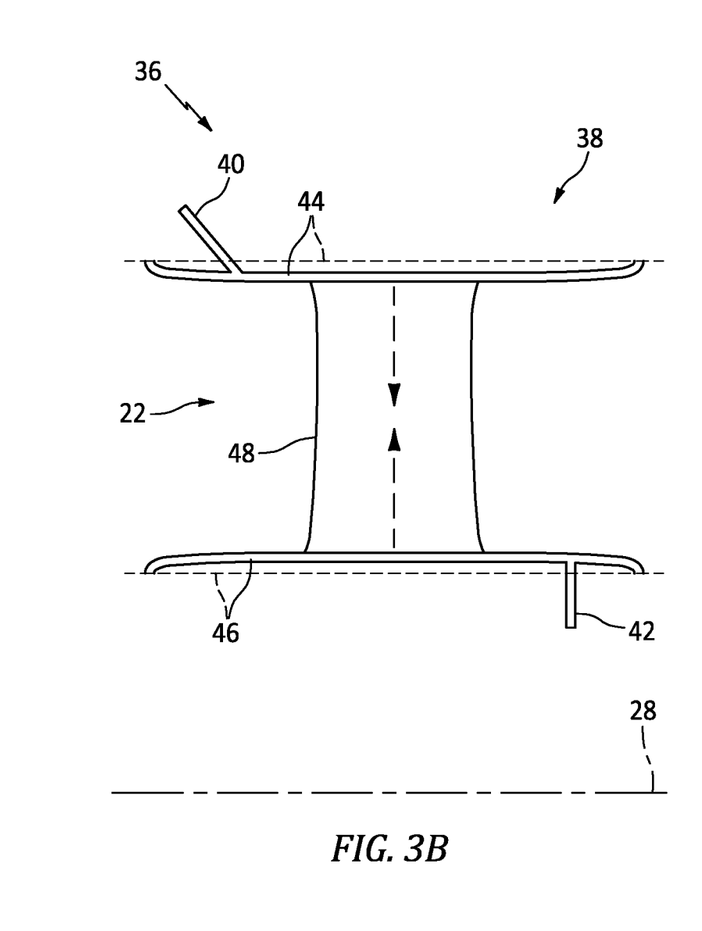
FIG. 3B is a schematic illustration of a portion of a vane array structure during uneven thermal contraction.

FIG. 3A illustrates a rapid heating and, thus, thermally induced expansion of an exemplary one of the vanes 48 relative to the surrounding hot section structure 36. FIG. 3B illustrates a rapid cooling and, thus, thermally induced contraction of an exemplary one of the vanes 48 relative to the surrounding hot section structure 36. Such uneven thermal expansion (or contraction) of the structure components 44, 46 and 48 may impart relatively high internal stresses on the vane array structure 38, particularly at interfaces (e.g., connections) between the vanes 48 and the outer platform 44 and the inner platform 46, at an interface (e.g., connection) between the outer platform 44 and the outer structural support 40 and/or at an interface (e.g., connection) between the inner platform 46 and the inner structural support 42.

Figure 4:
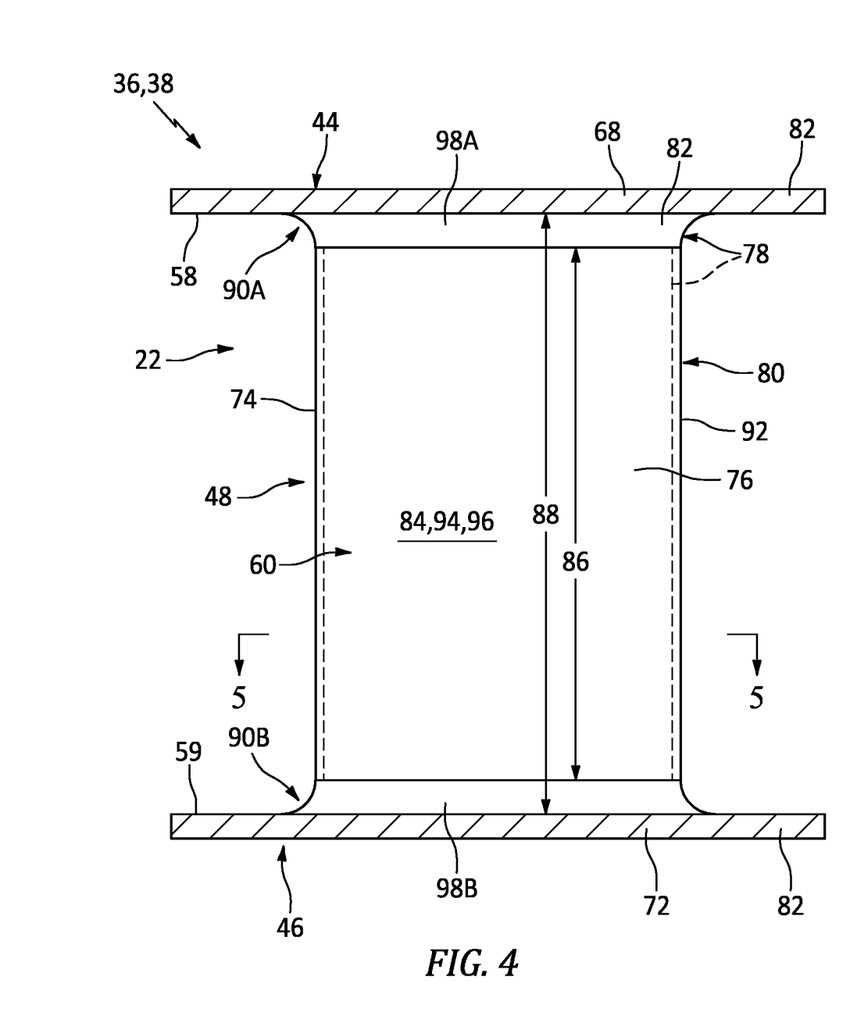
FIG. 4 is a sectional illustration of a portion of a vane array structure configured with thermal barrier material over a portion of each vane.
Figure 5:
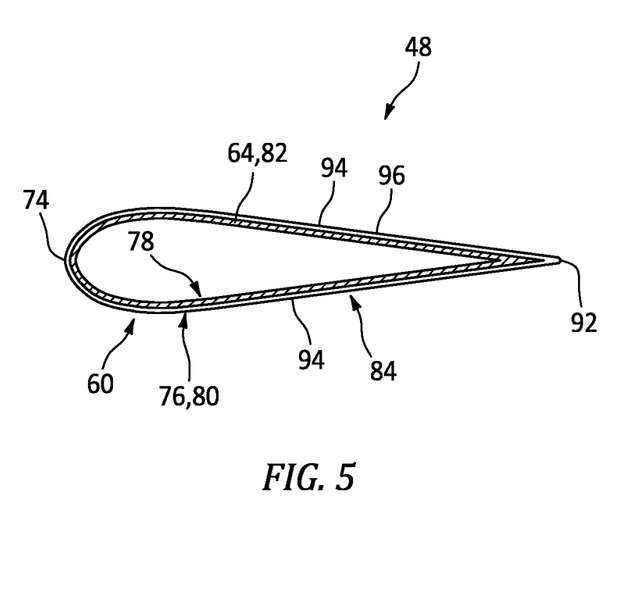
FIG. 5 is a cross-sectional illustration of a vane of the vane array structure taken along line 5-5 in FIG. 4.

Referring to FIGS. 4 and 5, to reduce thermal gradients across the hot section structure 36 and, more particularly, its vane array structure 38, thermal barrier material 76 is selectively applied to the hot section structure 36 and its vane array structure 38. Each vane 48 of FIGS. 4 and 5, for example, includes a vane body 78 and a coating 80 of the thermal barrier material 76; e.g., thermal barrier coating (TBC). The vane body 78 (as well as bodies of the outer platform 44 and the inner platform 46 of FIG. 4) are constructed from metal 82 such as, but not limited to, a nickel-based alloy; e.g., a nickel-based superalloy such as Inconel 625, Inconel 718, Inconel 792 or Mar-M-247. The thermal barrier material 76 may be a ceramic or other composite material such as, but not limited to, a ceramic oxide; e.g., $Al_2O_3$, $SiO_2$, $ZrO_2$ or yttria-stabilized zirconia (YSZ).

The thermal barrier coating 80 of FIGS. 4 and 5 is applied to an exterior of the respective vane body 78, and may cover at least a major portion of the vane exterior. The thermal barrier coating 80 of FIG. 4, for example, (e.g., completely) covers an intermediate coated region 84 of the vane exterior with a spanwise height 86 (e.g., radial height) of at least seventy-five percent (75%) of an overall spanwise height 88 (e.g., radial height) of the respective vane 48 between the platforms 44 and 46. The coated region height 86, for example, may be greater than eighty or ninety percent (80-90%) of the vane height 88. The coated region height 86 of FIG. 4, however, is less than the vane height 88 to provide one or more un-coated end regions 90A and 90B (generally referred to as "90"). Referring to FIG. 5, the coated region 84 may also extend (e.g., completely) around an outer perimeter of the respective vane 48. The thermal barrier coating 80 may therefore (e.g., completely) form the leading edge 74, a trailing edge 92 and lateral sides 94 of the respective vane 48 within the coated region 84. The thermal barrier material 76 may thereby form at least seventy-five percent (75%) of an external surface area of the vane 48 that is exposed to the hot gases flowing through the gas path 22. The thermal barrier material 76, for example, may form more than eighty or ninety percent (80-90%) of the external surface area.

The thermal barrier material 76 of FIGS. 4 and 5 forms a coated vane surface 96. This coated vane surface 96 is an exterior gas path surface of the vane 48; e.g., a segment of the vane exterior surface 60 of FIG. 1. The coated vane surface 96 forms a boundary of and is directly exposed to the hot gases within the gas path 22.

Referring to FIG. 4, each end region 90 may be configured without any thermal barrier material. The metal 82 of the vane body 78 may thereby form one or more uncoated vane surfaces 98A and 98B (generally referred to as "98"). Each uncoated vane surface 98 is an exterior gas path surface of the vane 48; e.g., a segment of the vane exterior surface 60 of FIG. 1. Each uncoated vane surface 98 forms a boundary of and is directly exposed to the hot gases within the gas path 22. Each uncoated vane surface 98A, 98B of FIG. 4 extends between and is contiguous with coated vane surface 96 and the respective platform surface 58, 59.

The outer platform 44 and/or the inner platform 46 may also be configured without any thermal barrier material. The metal 82 of the outer platform 44 may thereby form at least a portion or an entirety of the outer platform inner surface 58. The metal 82 of the inner platform 46 may similarly form at least a portion or an entirety of the inner platform outer surface 59.

With the foregoing arrangement, the thermal barrier coating 80 of FIGS. 4 and 5 insulates the hot gases flowing though the gas path 22 from the underlying metal 82 of the respective vane body 78 in the coated region 84. Thermal expansion (or contraction) of the underlying metal 82 of the respective vane body 78 in the coated region 84 may thereby be slowed to more closely match the thermal expansion (or contraction) of the metal 82 of the outer platform 44 and/or the thermal expansion (or contraction) of the metal 82 of the inner platform 46. This may reduce thermal gradients across the vane array structure 38 and, thus, reduce internal stresses on the vane array structure 38.

Figure 6:
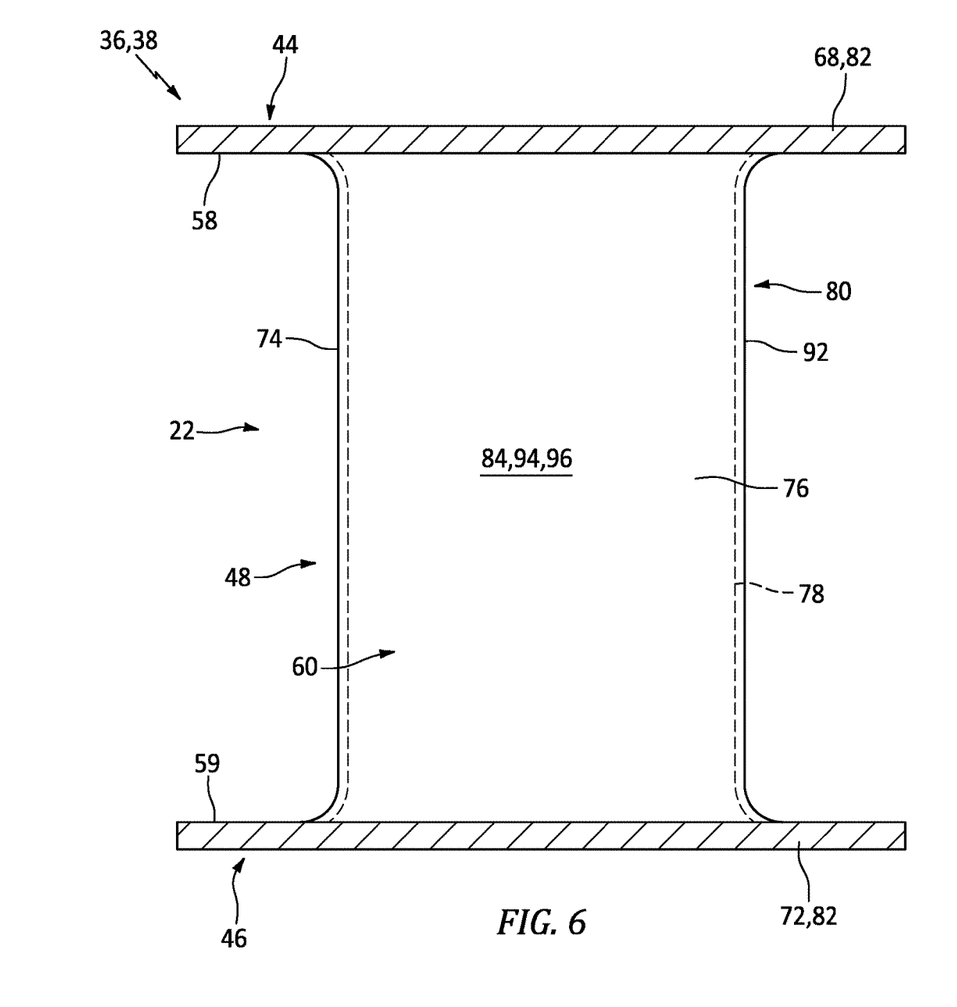
FIG. 6 is a sectional illustration of a portion of the vane array structure configured with the thermal barrier material over an entirety of each vane.

In some embodiments, referring to FIG. 6, the thermal barrier coating 80 and the associated coated region 84 may extend spanwise (e.g., radially) to the outer platform 44 and/or the inner platform 46. The coated vane surface 96 thereby extends between and is contiguous with the outer platform inner surface 58 and the inner platform outer surface 59. The thermal barrier coating 80 of FIG. 6, for example, completely covers the exterior of the vane body 78.

In some embodiments, referring to FIGS. 4 and 6, each coated vane surface 96 may be longitudinally (e.g., axially along the rotational axis 28) aligned with and overlap one or more uncoated gas path surfaces of the hot section structure 36; e.g., the surfaces 58, 59, 98A and/or 98B. Each coated vane surface 96 may also (or alternatively) be laterally (e.g., circumferentially about the rotational axis 28) aligned with and overlap one or more uncoated gas path surfaces of the hot section structure 36; e.g., the surfaces 58, 59, 98A and/or 98B.

In some embodiments, each coated vane surface 96 may be upstream of at least a portion (or an entirety) of one or more uncoated gas path surfaces of the hot section structure 36; e.g., the surfaces 58 and 59. Each coated vane surface 96 may also or alternatively be downstream of at least a portion (or an entirety) of one or more uncoated gas path surfaces of the hot section structure 36; e.g., the surfaces 58 and 59.

Figure 7:
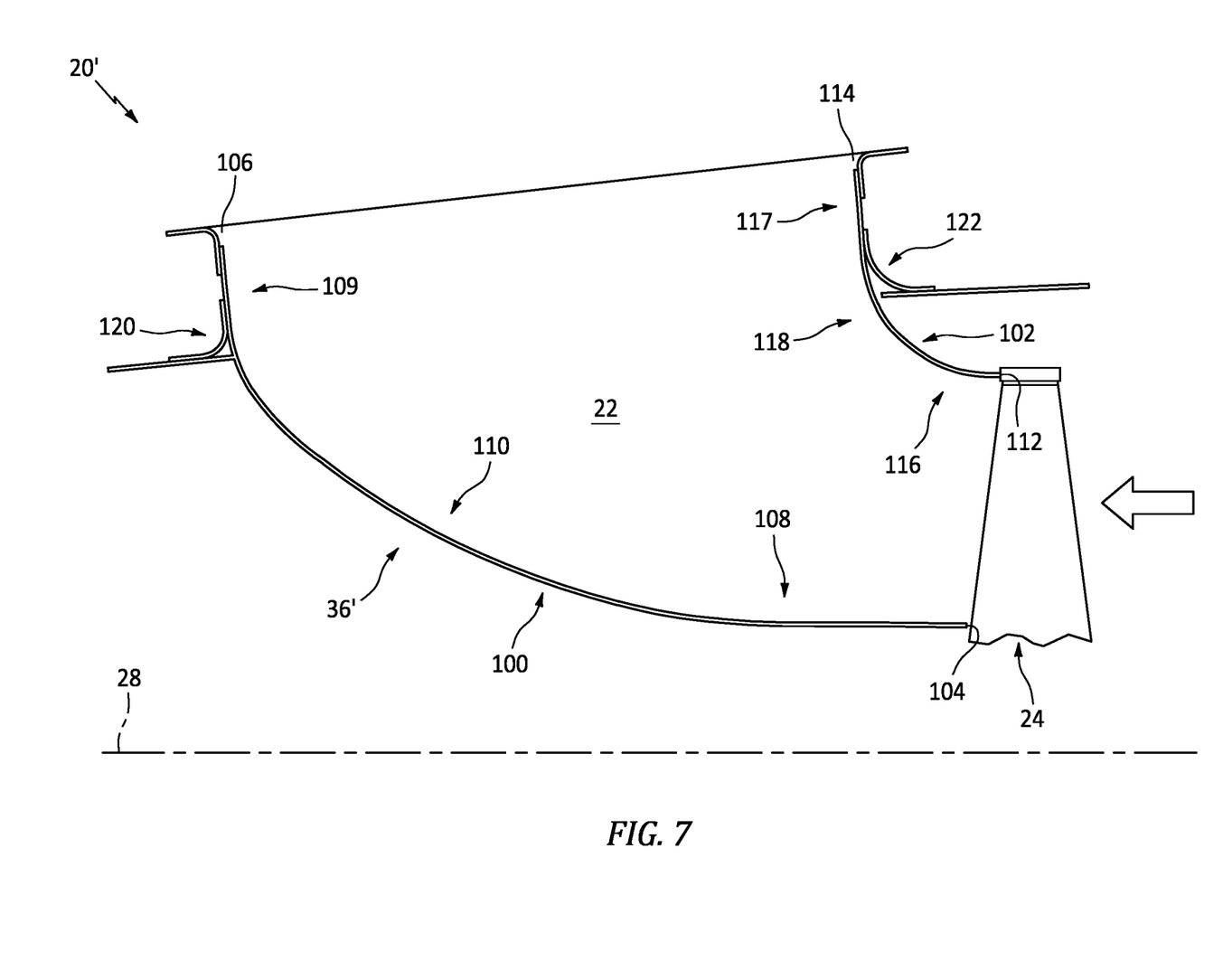
FIG. 7 is a schematic sectional illustration of a portion of another hot section of the gas turbine engine.

FIG. 7 illustrates another hot section 20' of the gas turbine engine. This hot section 20' may be configured as a turbine exhaust section of the gas turbine engine. The hot section 20' of FIG. 7 includes a hot section structure 36' (e.g., a duct) with a plurality of gas path walls such as an inner wall 100 and an outer wall 102.

The inner wall 100 extends longitudinally between and to an upstream end 104 and a downstream end 106. The inner wall 100 includes an upstream segment 108, a downstream segment 109 and an intermediate segment 110.

The inner wall upstream segment 108 is disposed at the inner wall upstream end 104. The inner wall upstream segment 108 of FIG. 7, for example, extends substantially axially along the rotational axis 28 from the inner wall upstream end 104 to the inner wall intermediate segment 110. This inner wall upstream segment 108 may be parallel with the rotational axis 28, or at least a (e.g., downstream) portion of the inner wall upstream segment 108 may have a slight slope with a radial rise to an axial run of less than, for example, 0.15; e.g., less than 0.1. The radial rise to the axial run, of course, may alternatively be greater than 0.15 in other embodiments; e.g., between 0.15 and 0.3. At least a (e.g., upstream) portion (or an entirety) of the inner wall upstream segment 108 may have a straight sectional geometry when viewed, for example, in a reference plane parallel with the rotational axis 28. At least a (e.g., downstream) portion (or an entirety) of the inner wall upstream segment 108 may also or alternatively have a slightly curved sectional geometry when viewed, for example, in the reference plane.

The inner wall downstream segment 109 is disposed at the inner wall downstream end 106. The inner wall downstream segment 109 of FIG. 7, for example, extends substantially radially inward from the inner wall downstream end 106 to the inner wall intermediate segment 110. This inner wall downstream segment 109 may be perpendicular to the rotational axis 28, or at least a (e.g., upstream) portion of the inner wall downstream segment 109 may have a slight slope with a radial rise to an axial run of greater than, for example, 4; e.g., greater than 6. The radial rise to the axial run, of course, may alternatively be less than 4 in other embodiments; e.g., between 2 and 4. At least a (e.g., downstream) portion (or an entirety) of the inner wall downstream segment 109 may have a straight sectional geometry when viewed, for example, in the reference plane. At least a (e.g., upstream) portion (or an entirety) of the inner wall downstream segment 109 may also or alternatively have a slightly curved sectional geometry when viewed, for example, in the reference plane.

The inner wall intermediate segment 110 is arranged and extends longitudinally between the inner wall upstream segment 108 and the inner wall downstream segment 109. This inner wall intermediate segment 110 provides a transition (e.g., a turning segment) between the inner wall upstream segment 108 and the inner wall downstream segment 109. At least a portion or an entirety of the inner wall intermediate segment 110, for example, has a curved sectional geometry when viewed, for example, in the reference plane that transitions from the substantially axial trajectory of the inner wall upstream segment 108 to the substantially radial trajectory of the inner wall downstream segment 109.

The outer wall 102 extends longitudinally between and to an upstream end 112 and a downstream end 114. The outer wall 102 includes an upstream segment 116, a downstream segment 117 and an intermediate segment 118.

The outer wall upstream segment 116 is disposed at the outer wall upstream end 112. The outer wall upstream segment 116 of FIG. 7, for example, extends substantially axially along the rotational axis 28 from the outer wall upstream end 112 to the outer wall intermediate segment 118. This outer wall upstream segment 116 may be parallel with the rotational axis 28, or at least a (e.g., downstream) portion of the outer wall upstream segment 116 may have a slight slope with a radial rise to an axial run of less than, for example, 0.15; e.g., less than 0.1. The radial rise to the axial run, of course, may alternatively be greater than 0.15 in other embodiments; e.g., between 0.15 and 0.3. At least a (e.g., upstream) portion (or an entirety) of the outer wall upstream segment 116 may have a straight sectional geometry when viewed, for example, in a reference plane parallel with the rotational axis 28. At least a (e.g., downstream) portion (or an entirety) of the outer wall upstream segment 116 may also or alternatively have a slightly curved sectional geometry when viewed, for example, in the reference plane.

The outer wall downstream segment 117 is disposed at the outer wall downstream end 114. The outer wall downstream segment 117 of FIG. 7, for example, extends substantially radially inward from the outer wall downstream end 114 to the outer wall intermediate segment 118. This outer wall downstream segment 117 may be perpendicular to the rotational axis 28, or at least a (e.g., upstream) portion of the outer wall downstream segment 117 may have a slight slope with a radial rise to an axial run of greater than, for example, 4; e.g., greater than 6. The radial rise to the axial run, of course, may alternatively be less than 4 in other embodiments; e.g., between 2 and 4. At least a (e.g., downstream) portion (or an entirety) of the outer wall downstream segment 117 may have a straight sectional geometry when viewed, for example, in the reference plane. At least a (e.g., upstream) portion (or an entirety) of the outer wall downstream segment 117 may also or alternatively have a slightly curved sectional geometry when viewed, for example, in the reference plane.

The outer wall intermediate segment 118 is arranged and extends longitudinally between the outer wall upstream segment 116 and the outer wall downstream segment 117. This outer wall intermediate segment 118 provides a transition (e.g., a turning segment) between the outer wall upstream segment 116 and the outer wall downstream segment 117. At least a portion or an entirety of the outer wall intermediate segment 118, for example, has a curved sectional geometry when viewed, for example, in the reference plane that transitions from the substantially axial trajectory of the outer wall upstream segment 116 to the substantially radial trajectory of the outer wall downstream segment 117.

The hot section structure 36' (e.g., the duct) is connected to one or more external (e.g., support) structures 120 and 122 at (e.g., on, adjacent or proximate) the inner wall downstream end 106 and the outer wall downstream end 114. The gas path walls 100 and 102 provide a thermal buffer between the gas path 22 extending longitudinally through the hot section structure 36' and the external structures 120 and 122. The hot section structure 36' and its gas path walls 100 and 102 may thereby heat up (or cool down) quicker than the external structures 120 and 122, particularly during transient conditions. This may result in the hot section structure 36' pushing radially outward against the external structures 120 and 122 where the gas path walls 100 and 102 heat up quicker than the external structures 120 and 122, or pulling radially inwards against the external structures 120 and 122 where the gas path walls 100 and 102 cool down quicker than the external structures 120 and 122. Such uneven thermal expansion (or contraction) of the components 36', 120 and 122 may impart relatively high internal stresses on the hot section structure 36', particularly at an interface (e.g., connection) between the inner wall 100 and the external structure 120 and/or at an interface (e.g., connection) between the outer wall 102 and the external structure 122.

Figure 8:
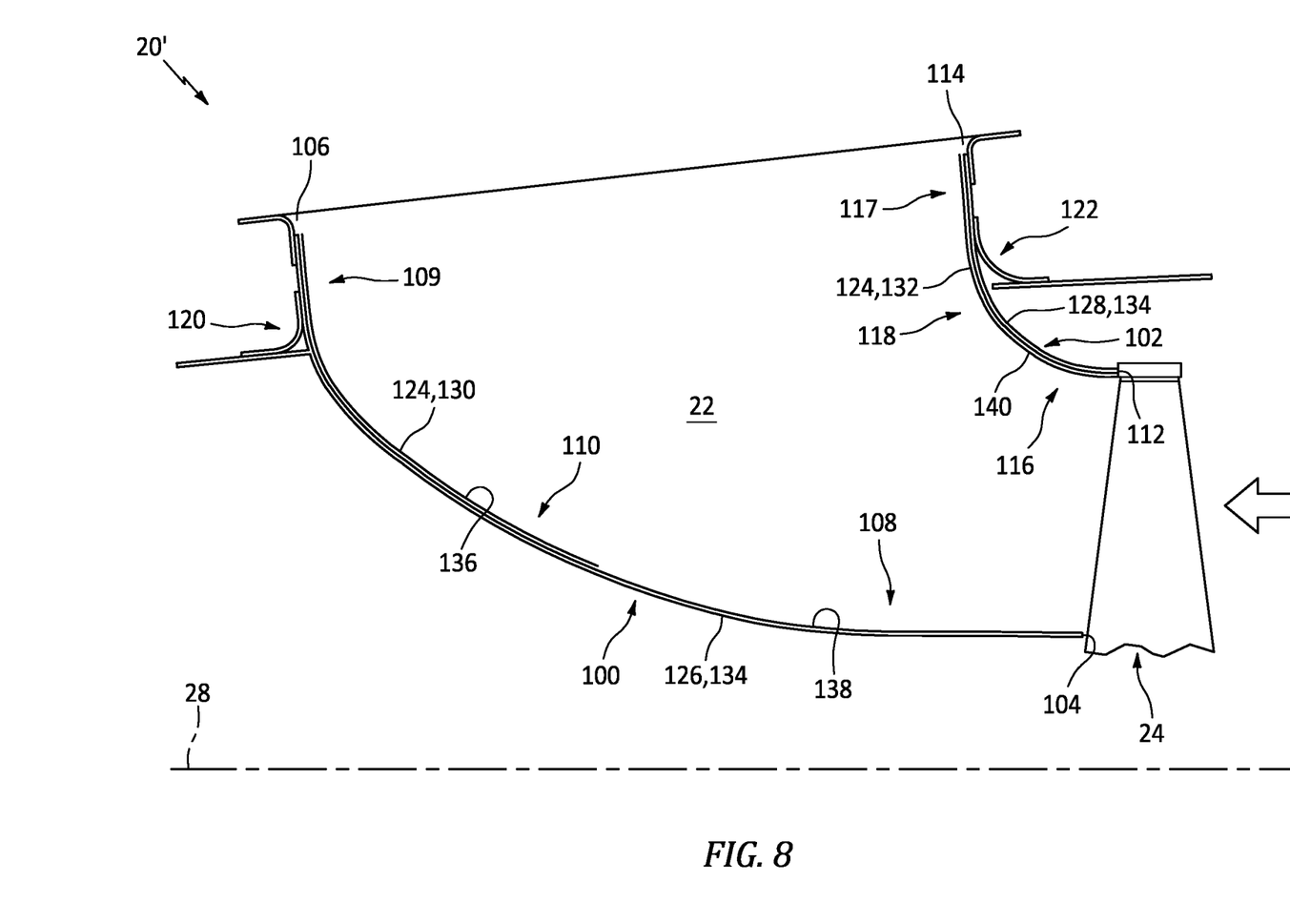
FIG. 8 is a schematic sectional illustration of a portion of the hot section of FIG. 7 configured with thermal barrier material.

Referring to FIG. 8, to reduce thermal gradients across the hot section assembly, thermal barrier material 124 is selectively applied to the hot section structure 36' and its gas path walls 100 and 102. Each gas path wall 100, 102 of FIG. 8, for example, includes a wall body 126, 128 and a wall coating 130, 132 of the thermal barrier material 124; e.g., inner wall thermal barrier coating (TBC). The wall body 126, 128 is constructed from metal 134 such as, but not limited to, a nickel-based alloy; e.g., a nickel-based superalloy such as Inconel 625, Inconel 718, Inconel 792 or Mar-M-247. The thermal barrier material 124 may be a ceramic or other composite material such as, but not limited to, a ceramic oxide; e.g., $Al_2O_3$, $SiO_2$, $ZrO_2$ or yttria-stabilized zirconia (YSZ).

The inner wall thermal barrier coating 130 of FIG. 8 is applied onto the inner wall body 126 along the inner wall segments 109 and 110. This inner wall thermal barrier coating 130 thereby extends longitudinally along the inner wall body 126 from the inner wall upstream segment 108 to the inner wall downstream end 106. The thermal barrier material 124 of FIG. 8 forms a coated inner wall surface 136. This coated inner wall surface 136 is a gas path surface of the inner wall 100. The coated inner wall surface 136 forms a boundary of and is directly exposed to the hot gases within the gas path 22.

The inner wall upstream segment 108 of FIG. 8 is configured without any thermal barrier material. The metal 134 of the inner wall body 126 may thereby form an uncoated inner wall surface 138. This uncoated inner wall surface 138 is a gas path surface of the inner wall 100, which is upstream and contiguous with the coated inner wall surface 136. The uncoated inner wall surface 138 forms a boundary of and is directly exposed to the hot gases within the gas path 22.

The outer wall thermal barrier coating 132 of FIG. 8 is applied onto the outer wall body 128 along the outer wall segments 116-118. This outer wall thermal barrier coating 132 thereby extends longitudinally along the outer wall body 128 from the outer wall upstream end 112 to the outer wall downstream end 114. The thermal barrier material 124 of FIG. 8 forms a coated outer wall surface 140. This coated outer wall surface 140 is a gas path surface of the outer wall 102. The coated outer wall surface 140 forms a boundary of and is directly exposed to the hot gases within the gas path 22.

With the foregoing arrangement, the thermal barrier coatings 130 and 132 of FIG. 8 insulate the hot gases flowing through the gas path 22 from the underlying metal 134 of the inner wall 100 and the outer wall 102. Thermal expansion (or contraction) of the underlying metal 134 of the respective gas path wall 100, 102 where coated may thereby be slowed to more closely match the thermal expansion (or contraction) of metal of the respective exterior structure 120, 122. This may reduce thermal gradients across the hot section assembly and, thus, reduce internal stresses on the respective gas path wall 100, 102.

Figure 9:
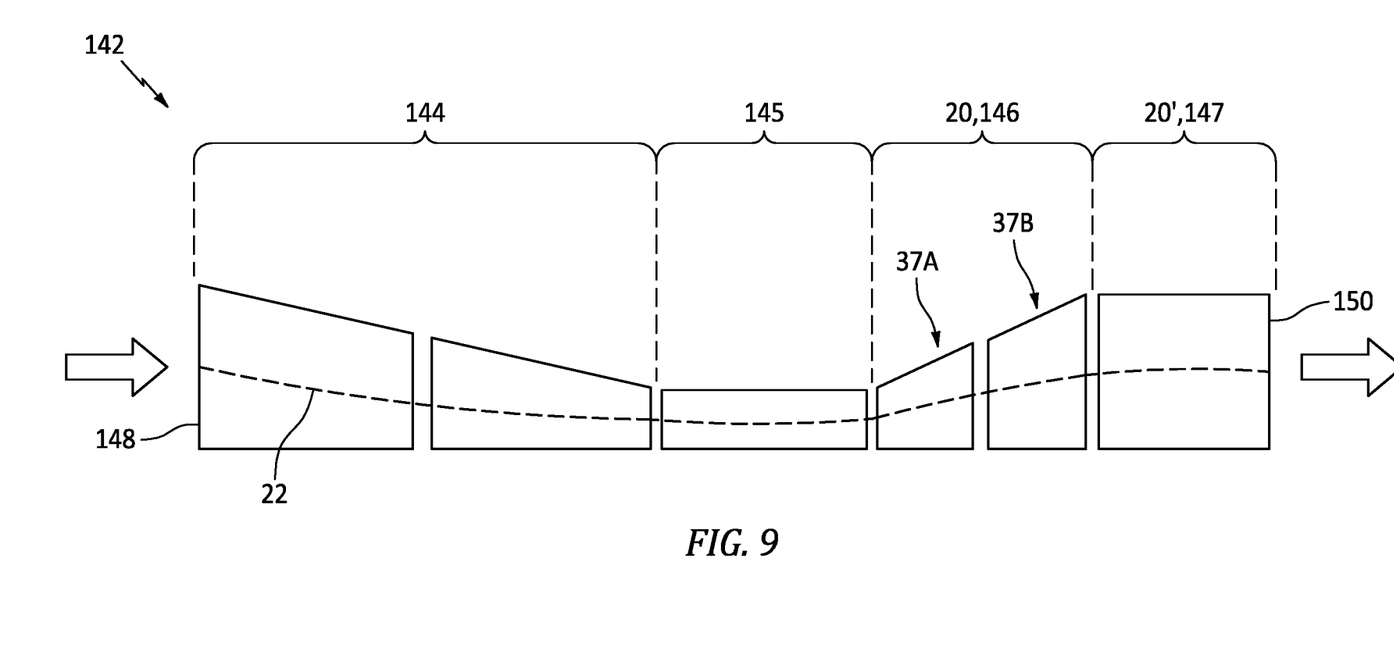
FIG. 9 is a schematic illustration of the gas turbine engine.

FIG. 9 is a schematic illustration of a gas turbine engine 142 which may include one or more of the hot sections 20 and/or 20'. This gas turbine engine 142 includes a compressor section 144, a combustor section 145, a turbine section 146 and an exhaust section 147. The gas path 22 extends longitudinally sequentially through the compressor section 144, the combustor section 145, the turbine section 146 and the exhaust section 147 from an upstream engine inlet 148 to a downstream engine exhaust 150. During operation, air enters the gas turbine engine 142 and the gas path 22 through the engine inlet 148. This air is compressed by the compressor section 144 and directed into the combustor section 145. Within the combustor section 145, the compressed air is mixed with fuel and ignited to produce the hot gases; e.g., combustion products. These hot gases are directed out of the combustor section 145 and into the turbine section 146 to drive compression within the compressor section 144. The hot gases then flow through the exhaust section 147 and are exhausted form the gas turbine engine 142 through the engine exhaust 150.

The gas turbine engine 142 may be configured as a geared gas turbine engine, where a gear train connects one or more shafts to one or more rotors. The gas turbine engine 142 may alternatively be configured as a direct drive gas turbine engine configured without a gear train. The gas turbine engine 142 may be configured with a single spool, with two spools, or with more than two spools. The gas turbine engine 142 may be configured as a turbofan engine, a turbojet engine, a turboprop engine, a turboshaft engine, a propfan engine, a pusher fan engine or any other type of gas turbine engine. The gas turbine engine 142 may alternative be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a gas turbine engine, comprising:
a hot section structure of the gas turbine engine;
the hot section structure configured with a plurality of surfaces respectively forming boundaries of a gas path through the hot section structure, the plurality of surfaces including an uncoated first surface and a second surface; and
the hot section structure including metal and thermal barrier material, the uncoated first surface formed by the metal, and the second surface formed by the thermal barrier material;
wherein the uncoated first surface is formed by the metal such that the metal forming the uncoated first surface is configured to be directly exposed to hot gas flowing through the gas path; and
wherein the hot section structure comprises a vane, and the thermal barrier material forms at least a portion of a trailing edge of the vane.

2. The apparatus of claim 1, wherein the thermal barrier material comprise ceramic.

3. The apparatus of claim 1, wherein the uncoated first surface is contiguous with the second surface.

4. The apparatus of claim 1, wherein
the gas path extends longitudinally through the hot section structure; and
the uncoated first surface is longitudinally aligned with the second surface.

5. The apparatus of claim 1, wherein
the gas path extends longitudinally through the hot section structure; and
the uncoated first surface is laterally aligned with the second surface.

6. The apparatus of claim 1, wherein at least a portion of the uncoated first surface is upstream of the second surface along the gas path.

7. The apparatus of claim 6, further comprising a combustor section upstream of the hot section structure along the gas path.

8. The apparatus of claim 1, wherein
the vane extends across the gas path; and
the vane includes the uncoated first surface and the second surface.

9. The apparatus of claim 8, wherein the thermal barrier material forms at least seventy-five percent of an external surface area of the vane that is exposed to the gas path.

10. The apparatus of claim 1, wherein
the hot section structure further comprises a gas path wall;
the vane projects out from the gas path wall;
the gas path wall comprises the uncoated first surface; and
the vane comprises the second surface.

11. The apparatus of claim 1, wherein
at least a portion of the uncoated first surface has a straight sectional geometry; and
at least a portion of the second surface has a curved sectional geometry.

12. The apparatus of claim 1, wherein the hot section structure comprises a turbine exhaust structure.

13. The apparatus of claim 1, wherein the hot section structure comprises a turbine support structure.

14. The apparatus of claim 1, wherein the hot section structure comprises a vane array structure.

15. An apparatus for a gas turbine engine, comprising:
a hot section structure of the gas turbine engine;
the hot section structure configured with a plurality of surfaces respectively forming boundaries of a gas path through the hot section structure, the plurality of surfaces including an uncoated first surface and a second surface; and
the hot section structure including metal and thermal barrier material, the uncoated first surface formed by the metal, and the second surface formed by the thermal barrier material;
wherein a portion of the hot section structure forming the uncoated first surface is configured without any thermal barrier material; and
wherein the hot section structure comprises a vane, and the thermal barrier material forms at least a portion of a trailing edge of the vane.

\* \* \* \* \*